C. W. SIMMONS.
DRY CELL BATTERY.
APPLICATION FILED FEB. 11, 1913.
1,087,612.
Patented Feb. 17, 1914.
3 SHEETS—SHEET 1.
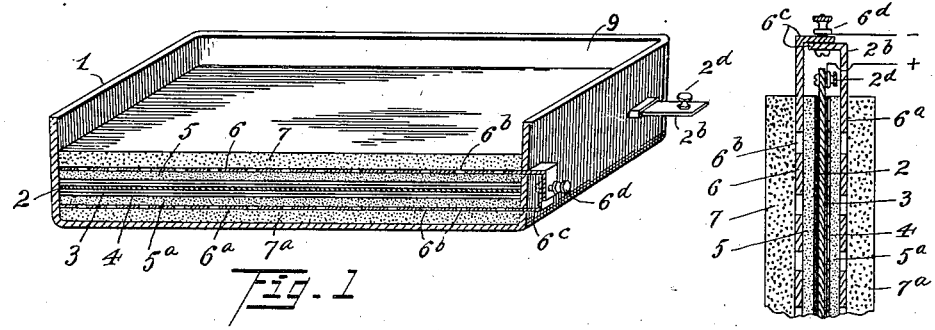
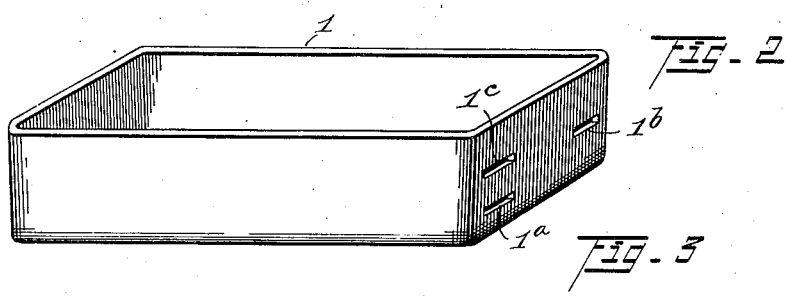
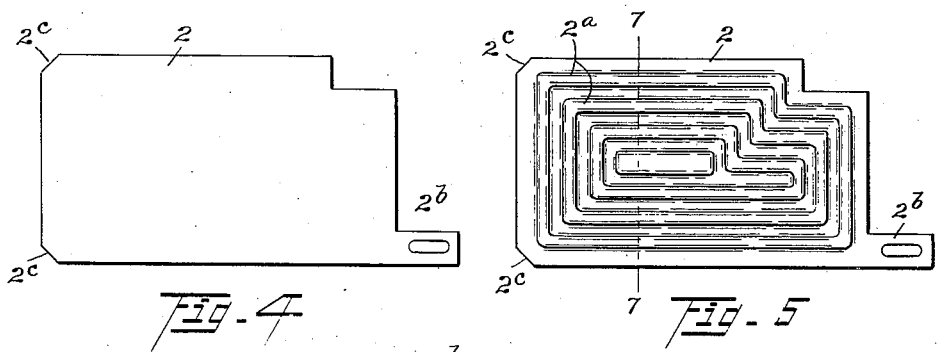
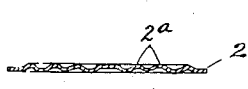
Witnesses:
Inventor
Charles W. Simmons
by Griswold
Attorney C. W. SIMMONS.
DRY CELL BATTERY.
APPLICATION FILED FEB. 11, 1913.
1,087,612.
Patented Feb. 17, 1914.
3 SHEETS—SHEET 2.
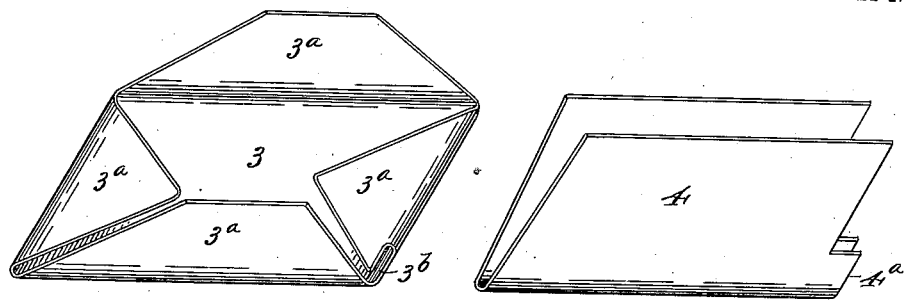
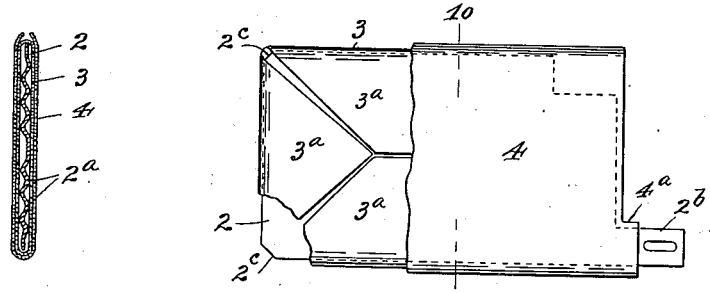
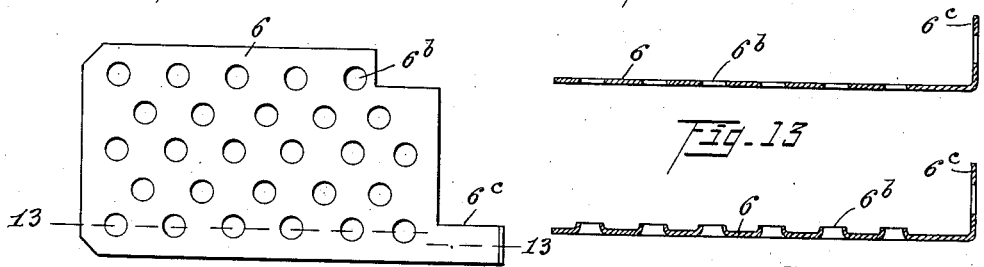
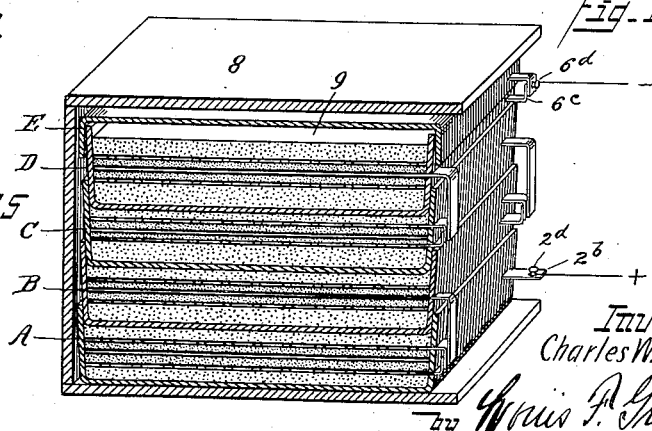
Witnesses:
Inventor
Charles W. Simmons
by Morris P. Griswold
Attorney C. W. SIMMONS.
DRY CELL BATTERY.
APPLICATION FILED FEB. 11, 1913.
1,087,612.
Patented Feb. 17, 1914.
3 SHEETS—SHEET 3.
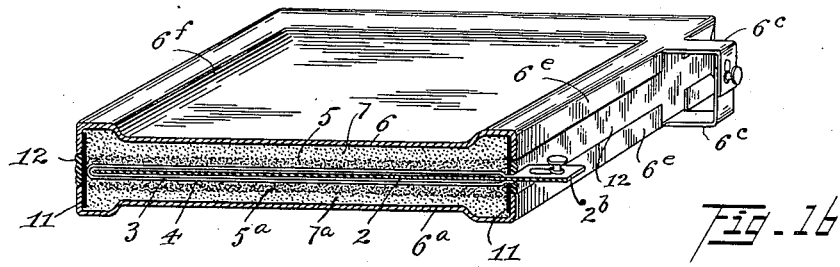
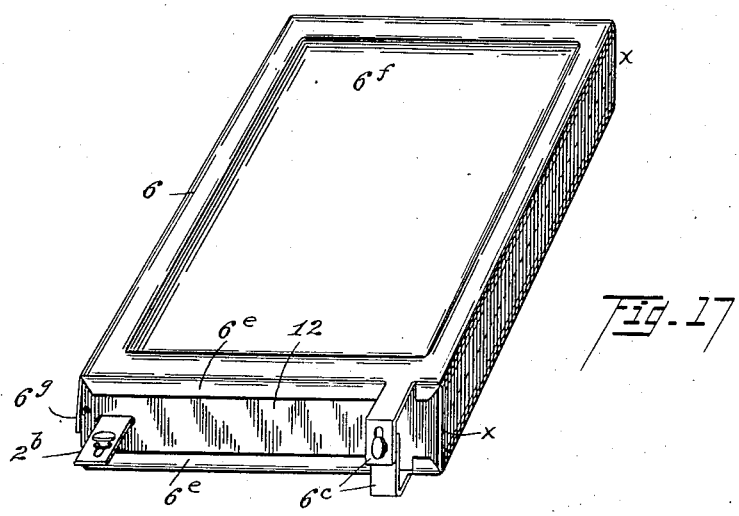
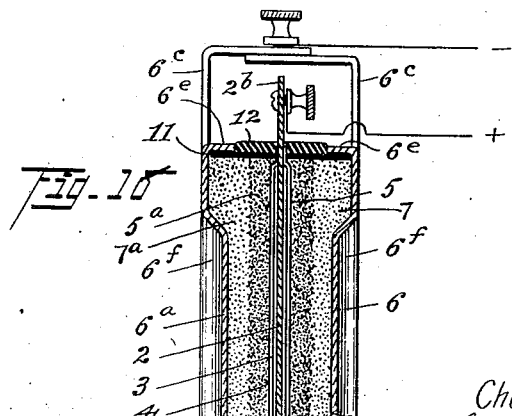
Witnesses:
Inventor
Charles W. Simmons
by Louis F. Griswold.
Attorney

UNITED STATES PATENT OFFICE.

CHARLES WILDER SIMMONS, OF EAST CLEVELAND, OHIO.

DRY-CELL BATTERY.

1,087,612.        Specification of Letters Patent.        Patented Feb. 17, 1914.

Application filed February 11, 1913. Serial No. 747,669.

*To all whom it may concern:*

Be it known that I, CHARLES WILDER SIMMONS, a citizen of the United States, residing at East Cleveland, in the county of Cuyahoga and State of Ohio, have invented a certain new and useful Improvement in Dry-Cell Batteries, of which the following is a specification.

My invention relates to the construction of dry cell batteries, the universal use of which is well known to those familiar with the art.

The objects of the invention are to provide a single cell battery that embodies all the elements which are essential to the operation of the battery, and to arrange and combine the said elements in such a manner as to greatly increase the effectiveness and the "shelf-life" of the battery, and at the same time to greatly decrease the cost of manufacture, by economizing in material used, by obtaining a greater efficiency from the elements, owing to their shape and their relative arrangement, by lessening the liability of producing imperfect cells, and by reducing the labor cost. The particular form and arrangement of the several elements of the cell, so that they may be subjected to practically unlimited pressure without damage, is a very desirable feature in the efficiency of the improved cell.

Another object of the invention is to provide a multiple cell battery, made up of a series of single cells, combined and connected in such a manner as to reduce the volume of space occupied by the battery to a minimum.

The simplicity of the construction, the relative arrangement of the several co-acting elements and the facility of assembling the single cells and the multiple cell battery, reduces the liability of imperfect, completed batteries to a minimum.

The necessary method and means employed in the manufacture of dry cell batteries in common use, to obtain the required result, is such that the elements are liable to be damaged in assembling, thereby destroying the efficiency of the battery, which is not apparent until the completed cell is tested; this results in the loss of a considerable per cent. of the finished cells.

In the assembling of the improved cell, the more or less severe treatment, which is the cause of the damage to the elements, is not necessary, and thus the chances of imperfect finished cells are practically eliminated.

The multiple battery now in general use, is made up of a series of single cells, properly connected and sealed within a box or container. The single cells are cylindrical in shape, and in assembling any number of them to form the multiple, results in a considerable waste space, that must be filled with suitable packing material, thereby making the multiple battery more or less cumbersome.

In the formation of the improved multiple there is no waste space, as one cell unit nests within another like unit, and as the volume of a single cell of the improved type is much less than that of an ordinary cell of the same amperage, the multiple battery is very much reduced in size.

Other objects of the invention will be apparent from the following description, reference being made to the accompanying drawings in which—

Figure 1 is a perspective view of the improved single cell, showing a vertical, longitudinal section of the same. Fig. 2 is a fragmentary view on an enlarged scale, showing the relative arrangement of the co-acting elements. Fig. 3 is a perspective view of the single case or container. Fig. 4 is a plan view of the positive plate, or anode. Fig. 5 is a plan view of a different form of anode. Fig. 6 illustrates the manner of cutting the positive plates, to economize in material. Fig. 7 is a section on line 7—7, Fig. 5. Fig. 8 is a perspective view of an absorbent member which envelopes the positive plate. Fig. 9 is a perspective view of an absorbent member which folds around the enveloping member. Fig. 10 is a section on line 10—10, Fig. 11. Fig. 11 is a plan view, showing the positive plate inclosed within the absorbent members, and partially in section. Fig. 12 is a plan view of the negative plate, or electrode. Fig. 13 is a section on line 13—13, Fig. 12, and Fig. 14 is a like section of a modified form of the negative plate. Fig. 15 is a perspective view, partially in section of the improved multiple cell battery, made up of a series of single cells. Fig. 16 is a perspective view of a modified form of cell, showing a vertical, longitudinal section. Fig. 17 is a perspective of the modified cell in a different position. Fig. 18 is a fragmentary view of the modified cell in section and on an enlarged scale, showing the relative arrangement of the elements.

Throughout the drawings and specifications, similar characters of reference designate similar parts.

The different elements which are employed in the improved battery, are of substantially the same material as that used in dry cell batteries now in universal use, but their difference in form, relative arrangement and combination, whereby a greater efficiency and "shelf-life" are obtained at a much less cost of production constitutes the invention.

Referring now to the drawings, 1 represents the single cell container, which is preferably of the form shown in Fig. 3, being a rectilinear, more or less shallow box, open at the top and having its four sides slightly flaring outwardly from the bottom to the top. The particular shape shown is preferable, inasmuch as it admits of economy of space and facility of assembling a series of single cells to form a multiple cell battery. The container is made of any suitable material, in the form shown in Figs. 1, 3 and 15, preferably of paste-board or like material, stamped or molded seamless, and thoroughly soaked and coated with asphaltum or other water, acid proof and insulating substance or compound.

The positive plate 2 is made of zinc, it may be plain and flat, but is preferably formed with ridges or other forms of indentations or perforations of more or less prominence, $2^a$ for retaining moisture when the plate is subjected to pressure. To economize in material, the plates 2 may be cut from the sheet as shown in Fig. 6.

It is imperative that the positive pole or anode be entirely separated from the negative pole or electrode; this is accomplished in the improved cell, by first inclosing the plate 2 in an envelop 3. The envelop is made of some highly absorbent material, preferably a well known paper pulp-board that absorbs about 150% of its own weight of water. The form of the envelop 3 is substantially as shown in Fig. 8, having the folding flaps $3^a$, which are adapted to fold down over the plate, and the opening $3^b$, through which the tongue $2^b$ of the plate protrudes. The corners of the plate 2 are cut away as shown at $2^c$, to prevent their protruding through the corners of the envelop 3. After the plate 2 has been enveloped within the member 3, a folder 4, made of the same kind of material as the envelop 3, and of slightly greater area, is wrapped around the envelop. A projection $4^a$ of the folder 4 surrounds the tongue $2^b$, and is adapted to project into a slot in the container, the purpose of which will appear later on. The pores of the material used for the folder and envelop are so small that the finest particles of carbon, used in the depolarizing mixture, will not be drawn through it by colloidal migration or capillary attraction to the zinc anode, thus preventing a high-resistance short-circuit between the carbon and zinc. The depolarizing mixture, of which there are two comparatively thin layers 5 and $5^a$, one on each side of the envelop plate 2, is composed of manganese dioxid, artificial graphite and zinc chlorid, moistened with an electrolyte of salammoniac and water. The two electrodes 6 and $6^a$ are in contact with the mixture layers 5 and $5^a$, on the opposite sides from the plate 2. Outside of the negative plates 6 and $6^a$, are layers 7 and $7^a$, of cheap, absorbent substance, preferably ground coke, these layers 7 and $7^a$ are saturated with water and electrolyte, and as the moisture in the mixture 5 and $5^a$ is reduced, under action of the current, it is replenished from the layers 7 and $7^a$ through perforations in the plates 6 and $6^a$, thus increasing the active life of the cell. The tongue $2^b$ of the anode is an integral part of the plate, while in the ordinary cylindrical cell, the container forms the positive pole, and the means for connection therewith is through the medium of a binding post connected with a piece soldered on to the positive pole or container.

In the improved battery the negative poles or electrodes are of novel construction, and form an important factor of the invention. These members may be made of thin sheet carbon, but it is desirable for economy and for adaptability to the novel form of the electrodes, to make them of light gage sheet metal, preferably iron. They are perforated as shown at $6^b$, and are thoroughly coated with a suitable non-corrosive, electrical conductive material, preferably graphite paint or graphite and asphaltum mixed with a highly volatile fluid, which will quickly evaporate, leaving a deposit of graphite adhering to the plate, through the medium of the asphaltum. The area of the electrodes may be increased by a flange around the opening $6^b$ as shown in Fig. 14. Tongues $6^c$ are formed integral with the plates 6 and $6^a$, for the purpose of connecting said plates, outside the container 1 as shown in Figs. 1 and 2, and also for connecting the single cells in making up the multiple, as shown in Fig. 15. The formation of the tongues $6^c$ integral with the electrode, as a connecting means, is an important feature of the invention, as it reduces the item of cost to a very considerable extent. The operation of connecting the binding post with the carbon plug, used in the ordinary dry cell is one of the most particular and difficult parts of the assemblage of the battery, and therefore adds greatly to its cost.

In the manufacture of the improved batteries, a suitable mold is used, in which the coke mixture 7 and $7^a$ is molded into cakes of the desired shape and thickness to fit the container. Similar molds are used for the mixture 5 and $5^a$.

In assembling a single cell, a cake $7^a$ is placed in the container 1, and on top of the cake $7^a$ is placed a negative plate $6^a$, the tongue of which extends out through the slot $1^a$ of the container, on top of the plate $6^a$ is placed a cake of depolarizing mixture $5^a$, and next in order comes the positive plate 2, which has first been inclosed in the envelop 3 and the folder 4, the tongue $2^b$, protected by the projection $4^a$, protruding through the slot $1^b$. On top of the plate 2, and in the order named, are the mixture 5, the negative plate 6, and the coke mixture 7, the tongue $6^c$ of the plate 6 protruding through the slot $1^c$. After the several elements are assembled as above described, the entire mass within the container is subjected to pressure, which produces a uniform compactness and contact of all the elements, without any liability of destroying the efficiency of the several elements, through abrasion or other causes. After subjecting the elements in the container to pressure, a cover of like material to that of the container is pressed down over the top of the container, and forms a closure member for the cell. If it is not desirable to have the top layer 7 of sufficient thickness to reach the top of the container, the intervening space 9 Fig. 1, may be filled with a block of suitable material and the required dimensions. The tongues $6^c$ of the plates 6 and $6^a$ are connected by a binding post $6^d$, the tongue $2^b$ is provided with a binding post $2^d$, and the single cell is complete.

It will be seen that the efficiency of the cell is greatly increased by the improved construction, for several reasons. The entire area of both sides of the positive plate is actively utilized. The depolarizing medium is spread over a greater area, and the negative pole is of greater area, while the volume of space occupied by the cell is much less than that of a cell of equal amperage of the ordinary type. The resistance is decreased by the diminished distance between the anode and the electrodes, owing to the thin layers of depolarizing mixture, and any size plate may be used without increasing the resistance.

In the construction of the ordinary dry cell, a can like casing is used, which is made of a sheet of zinc, rolled to form a cylinder of the desired diameter, the meeting edges are lapped and soldered, and the bottom is soldered in. In order to obtain the required function of the mixture which surrounds the electrode, it is necessary that it be very compact and of even consistency, this requires the ramming or tamping of the mixture in the casing, and in many cases results in opening the seams and causing leakage, thereby destroying the effectiveness of the cell. This is overcome in the improved cell, by the use of the flat or indentated zinc plate, and the shape and arrangement of the several elements.

In the ordinary form of cell, the resistance is necessarily greater, owing to the impracticability of separating the coke mixture from the depolarizing mixture. In the substantially flat layer construction of the improved cell, the depolarizing mixture and the coke mixture are easily separated.

Another important feature of the invention is, that by the use of the improved form of anode, a much lower grade of zinc may be employed, and at the same time a much greater efficiency obtained. It is well known to those familiar with the art, that the best results are obtained, by amalgamation of the zinc with mercury. In the formation of the cylindrical zinc member, this is practically prohibitive, from the fact that the heat of soldering destroys the amalgamation. The zinc plates of the improved cells are easily amalgamated, thereby permitting the use of a low grade of zinc. The amalgamation of the zinc plates also admits of the elimination of, or the reducing of the amount of zinc chlorid in the depolarizing mixture, as it reduces the local action. The life of the cell is materially increased by the outer layers of moisture retainers feeding to the depolarizing members, combined with the absorbent members surrounding the positive plate and the moisture retaining channels formed by the ridges, indentations or perforations on said plate. The cost of the cell is greatly reduced, owing to the requirement of a less amount of material for the various elements to produce an equal or greater efficiency, the elimination of the loss of cells damaged in assembling, and the simplicity of construction and facility of assembling, reducing the item of labor cost. There is also a great saving in the multiple cell battery, by increasing the size of the plates instead of connecting two or more small ones, as has been done in the past.

The multiple battery is made up of a series of single cells, as is the case in other multiple batteries, but the novel formation and relative arrangement of the various elements of the improved single cells, renders possible the production of a more compact and economical product. As shown in Fig. 15, the units, or single cells are nested within each other, the connecting tongues of the anode and the electrodes protruding from opposite sides of the alternating units, that is to say, the tongue 6ᶜ of the negative plates 6 and 6ᵃ of the unit A are connected with the tongue 2ᵇ of the positive plate 2, of the unit B, therefore, for convenience, the tongue 2ᵇ protrudes from the same side of the container of the unit B as the tongues 6ᶜ from the unit A. The tongues 6ᶜ of the unit B protrude from the opposite side for convenient connection with the tongue 2ᵇ of the unit C. In the case of a four cell multiple, as shown, the positive plate 2, of the unit A is provided with a binding post 2ᵈ, and the negative plates 6 and 6ᵃ of the unit D are connected by a binding post 6ᵈ, in perpendicular line with that of the positive connection of the unit A. It will be seen that this is made possible by reversing the position of the slots 1ᶜ and 1ᵃ and the slot 1ᵇ in the alternate container, and reversing the position of the tongues of the positive and negative plates, so that they will register with their respective slots. It will also readily be seen, that this does not necessitate the providing of right and left plates, as the two sides of the plate are the same.

In assembling the multiple, the bottom of the container of the unit B forms a closure for the unit A, as does the bottom of the unit C for the unit B, and the unit D for the unit C. A cap E, preferably of the same material as the container 1 forms a closure for the top unit. After the desired number of single cells or units are properly nested and connected, they may be inclosed in a snug fitting, suitable casing, provided with openings for the positive and negative connections. In Fig. 15 the casing 8 is shown in section and with one end and side removed.

Figs. 16, 17 and 18 illustrate a modified form of the battery, which is less expensive to manufacture, and is designed to meet the demand for an extremely low cost battery. This cell embodies all the essential elements of the cell herein before described, but their arrangement is slightly different, the container and electrodes are combined in one. The outer layers of coke mixture are dispensed with, or are combined with the depolarizing layers, or in other words, the depolarizing layers are made somewhat thicker than in the first described cell, the outer part, or layer, being the coke mixture, 7 and 7ᵃ, and the electrodes are the outer members of the cell, and are not perforated. In this construction, two layers 5 and 5ᵃ of the depolarizing mixture are used in the same relative arrangement to the enveloped anode 2, as in the single cell first described, and outside of the layers 5 and 5ᵃ are the electrodes 6 and 6ᵃ, which may be formed of a single plate, preferably of sheet iron, coated on the inner surface with the graphite compound; that is to say, the surface which is adapted to contact the layers 7 and 7ᵃ. The plate is formed around the mixture and the interposed, enveloped positive plate. It is provided with the connecting tongue 6ᶜ, and the end flaps 6ᵉ, which are adapted to fold over end members 11, of insulating material, to form a container. The meeting edges of the electrode plate are joined by any suitable means. After the several members have been assembled, the cell is subjected to pressure on both sides, which forms the depressions 6ᶠ in the electrodes, thereby compressing the mixture 5 and 5ᵃ and the mixture 7 and 7ᵃ to an even and compact condition. The ends are then sealed with pitch or other suitable material 12.

While I have described the electrodes in the modified form of cell, as made of one plate, wrapped around the other elements, it will be seen that there are various ways of accomplishing the same result which would be the equivalent of the single plate, as for example, two plates may be used and their meeting edges joined as shown at 6ᵍ Fig. 17, the opposite meeting edges being on the dotted line x—x, and joined in like manner. The two electrodes may be formed like a box, one electrode member telescoping the other, and after being subjected to pressure, their edges joined by any suitable means. The cell may be formed with the improved enveloped anode, a single layer of depolarizing mixture, and a single electrode.

It will be seen that the moisture retaining features of the zinc plate and the absorbent enveloping members, and the arrangement and active functions of the electrodes, are the same, the only difference being the combining of the moisture feeding layers 7 and 7ᵃ with the depolarizing layers 5 and 5ᵃ. In all other respects the two batteries are substantially the same.

It will be noted that in all of the forms herein described, the layer principle is adhered to, thereby admitting of unlimited pressure, a very desirable feature in the efficiency of the cell.

What I claim and desire to secure by Letters Patent is—

1. In a dry cell battery, a suitable cathode, a depolarizing mixture, an electrolyte, an anode consisting of a metallic plate provided with indentations which form reservoirs for the electrolyte, an envelop of absorbent material surrounding the anode plate, and a folder of like material surrounding the envelop, whereby the electrolyte is retained and the metallic plate is entirely protected from contact with the depolarizing mixture.

2. In a dry cell battery, an element comprising a suitable cathode, a depolarizing mixture, an anode plate consisting of a metallic plate inclosed within an absorbent enveloping member, whereby said metallic plate is entirely protected from contact with the depolarizing mixture, means for maintaining said element under pressure, a suitable electrolyte, indentations in said metallic plate, whereby reservoirs are formed for the electrolyte, and a connecting member on the metallic plate protruding from the enveloping member.

3. In a dry cell battery, an anode consisting of a zinc plate inclosed within an absorbent enveloping member, suitable cathodes and depolarizing mixture on both sides of the anode, a suitable electrolyte, and indentations on both sides of the zinc plate, which form reservoirs for the electrolyte.

4. In a dry cell battery, a suitable cathode, an anode consisting of a zinc plate inclosed within an absorbent enveloping member, a depolarizing mixture interposed between the cathode and the anode, said depolarizing mixture composed of manganese dioxid and graphite, a suitable electrolyte, indentations in the zinc plate which form reservoirs for the electrolyte, and a connecting member on the zinc plate protruding from the enveloping member.

5. In a dry cell battery, an anode consisting of a zinc plate inclosed within an absorbent enveloping member, whereby it is entirely protected from the depolarizing mixture, cathodes on both sides of the anode, a depolarizing mixture interposed between the cathodes and the anode, said mixture composed of manganese dioxid and graphite, a suitable electrolyte, indentations in both sides of the zinc plate, which form reservoirs for the electrolyte, a connecting member on the zinc plate protruding from the enveloping member, and means for connecting the cathodes.

6. In a dry cell battery, an anode consisting of a zinc plate inclosed within an absorbent enveloping member, whereby it is entirely protected from the depolarizing mixture, cathodes on both sides of the anode, a suitable depolarizing mixture interposed between the cathodes and the anode, a suitable electrolyte, indentations in both sides of the zinc plate which form reservoirs for the electrolyte, absorbent material outside the cathodes adapted to contain electrolyte, and perforations in the cathodes through which the electrolyte is fed to the depolarizing mixture and the anode.

7. In a dry cell battery, an anode consisting of a zinc plate inclosed within an absorbent enveloping member, whereby it is entirely protected from the depolarizing mixture, cathodes on both sides of the anode, a suitable depolarizing mixture interposed between the cathodes and the anode, a suitable electrolyte, indentations in both sides of the zinc plate which form reservoirs for the electrolyte, absorbent material outside the cathodes for containing electrolyte, perforations in the cathodes through which the electrolyte is fed to the depolarizing mixture and anode, and means for retaining the elements under pressure.

8. A multiple cell battery consisting of a series of single cells nested within each other, the bottom of one cell forming a closure for the adjoining cell, each single cell being provided with two perforated cathodes and an interposed anode, said anode being enveloped in absorbent material; layers of depolarizing mixture between the anode and the cathodes; layers of absorbent material outside the cathodes; means for retaining the elements under pressure; means for connecting the cathodes; and means for connecting the anode of one cell with the cathodes of the adjoining cell.

9. A multiple cell battery consisting of a series of single cells nested within each other, the bottom of one cell forming a closure for the adjoining cell, each single cell being provided with two perforated cathodes and in interposed anode, said anode being enveloped in absorbent material; layers of depolarizing mixture between the anode and the cathodes; layers of absorbent material outside the cathodes; means for connecting the cathodes; and means for connecting the anode of one cell with the cathodes of the adjoining cell.

CHARLES WILDER SIMMONS.

Witnesses:
  HOWARD G. JOULD,
  T. E. DECKAND.